Dec. 30, 1924.

F. COLONNA 1,521,150

AUTOMATIC GAS CUT-OFF

Filed April 25, 1923

INVENTOR.
Frank Colonna
BY
Abraham Aaron
ATTORNEY.

Patented Dec. 30, 1924.

1,521,150

UNITED STATES PATENT OFFICE.

FRANK COLONNA, OF BROOKLYN, NEW YORK.

AUTOMATIC GAS CUT-OFF.

Application filed April 25, 1923. Serial No. 634,637.

*To all whom it may concern:*

Be it known that I, FRANK COLONNA, a citizen of the United States, and a resident of the county of Kings, borough of Brooklyn, city and State of New York, have invented a new and useful Improvement in an Automatic Gas Cut-Off, of which the following is such a full, clear, and exact description as will enable anyone skilled in the art to which it appertains to make and use the same, reference being had to the accompanying drawing, which forms a part of this application.

An object of my invention is to shut off the valve automatically if the gas in the pipes should freeze, thus extinguishing the flame and causing the gas to escape through the outlets.

A further object of my invention is to extinguish a flame by means of shutting off the gas at any desired time by means of a gage or alarm clock.

The main object of my invention is to cause the gas in any sort of pipe whether it be a branch gas pipe, a gas main pipe or a gas fixture, to be shut off automatically, thus discontinuing the flow of gas.

To such ends my said invention comprises broadly an automatic gas cut-off, which object is attained by the illustrations in the drawing, and referring more specifically to the drawing,—

Figure 1:
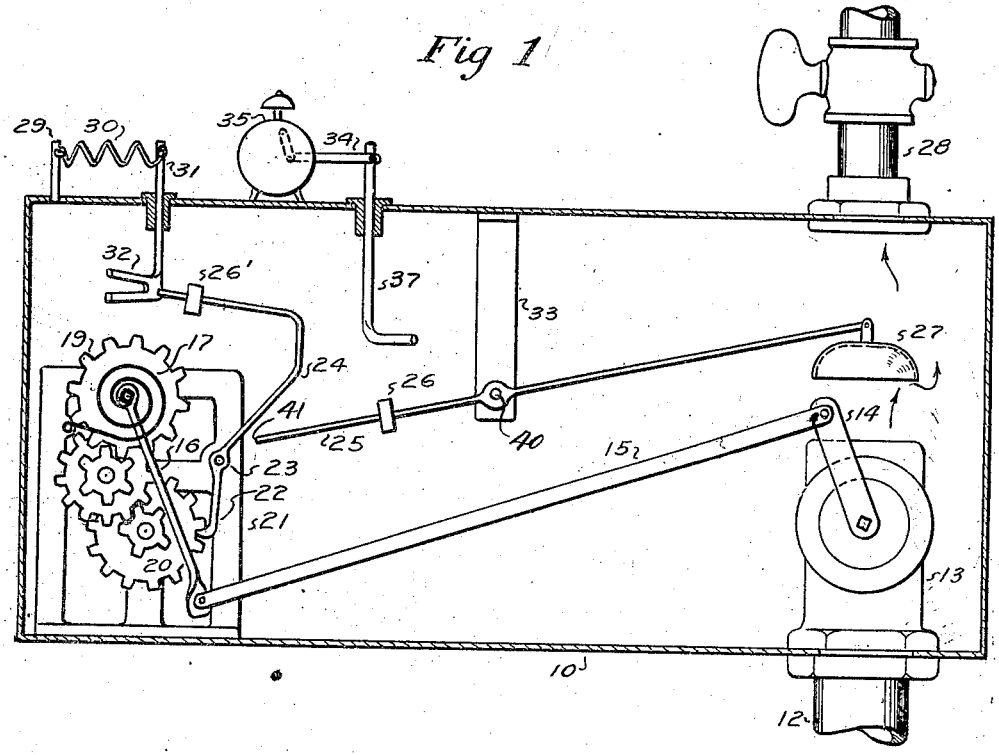
Figure 1, is a diagrammatical cross-section of the device with the valve open.

The operation of the device is as follows:

Referring to Figure 1, which shows my device with the valve (13) in an open position, the gas supply flows in through the pipe (12) and into the gas-tight cavity of the main box (10). Suspended immediately above the gas inlet pipe is the hemispherical float (27) which, by virtue of the flow of gas out of the valve (13) is kept up against the action of gravity. After flowing from under float (27) the gas passes on out of the box through pipe (28).

Should the flow of gas cease for any reason whatsoever, the buoyant effect of its velocity in leaving the valve (13) would be removed and the float (27) would fall by gravity. The lever (25) to which float (27) is attached would then turn on its pivot (40) and its end (41) would strike against and move lever (24). Lever (24) is mounted on a pivot (23) on the frame (21) of the spring motor and has one end bent to mesh and act as a pawl in the gear (20) of the motor. In the position shown in Figure 1, the pawl (22) is engaged with the gear and preventing its rotation.

The striking of lever (24) by the end (41) of lever (25) causes the pawl end of lever (24) to disengage itself from the teeth of gear (20) which permits spiral spring (17) to unwind and rotate gear (19) in a clock-wise direction. Mounted on the same shaft as gear (19) is the lever (16) which has attached to its extremity the lever or link (15) which is, in turn, connected to the shut-off lever (14) of the valve (13). As the shaft upon which are mounted gear (19) and lever (16) rotates under the action of the spring (17) the force exerted on lever (16) is transmitted by link (15) to shut-off lever (14) turning lever (14) in a counter-clockwise direction and thus closing the valve (13). The closing of this valve (13) shuts off the gas supply.

Figure 2:
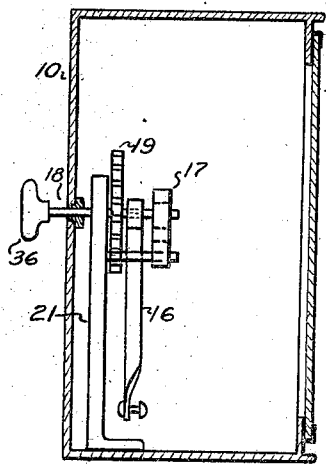
Figure 2, shows a transverse cross-section of the device.
Figure 3:
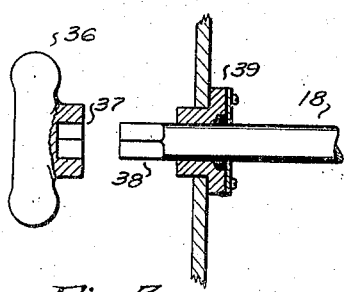
Figure 3, is a cross-section of the detail of the key.

When it is desired to re-set the apparatus the key (36) (Fig. 2 and Fig. 3) is applied to the square end (38) of shaft (18) to which gear (19), lever (16), and spring (17) are attached. By turning this key (36) the rotation of shaft (18) causes the levers (16, 15 and 14) to be moved so as to open the valve (13) and permit the flow of gas. Should pawl lever (24) fail to fall into mesh with locking gear (20) lever (31) may be twisted so that its forked end (32) will push against the stop (26') on lever (24) and cause its end (22) to mesh with gear (20) thus locking the spring motor with the spring stressed, ready to again close the valve, should the gas cease to flow.

The addition of the alarm clock (35) for controlling the shutting off of the gas at a pre-determined time is shown in Figure 1. The bent lever (37) is normally in the position shown. Attached to the alarm mechanism of the alarm-clock (35) is the lever (34) which, when actuated by the rotation of the alarm mechanism at the set time, causes lever (37) to be rotated so that its L shaped end comes in contact with pawl lever (24) and causes the gear train to be released thus closing the valve (13) by the mechanism as already described.

Without departing from the broad scope of my invention, I may from time to time, make slight changes.

I claim:

1. An automatic fluid cut-off comprising an oscillating member having one of its ends interposed in the flow of the fluid, a valve controlling the fluid supply, a mechanism for closing said valve, a pawl for holding said mechanism in position ready to close said valve, said pawl being adapted to be disengaged from said mechanism by the other end of said oscillating member when it swings to a certain position, together with a clock actuated mechanism extending within said box and adapted to engage said pawl independently of the oscillating member to disengage the pawl from the mechanism at a predetermined time.

2. An automatic fluid cut-off comprising a box, means for directing the flow of fluid through said box, a valve controlling the supply of the fluid, a mechanism for closing said valve, an oscillating member interposed in the flow of said fluid and adapted to change in position in response to the change of the flow, and means normally engaged with the mechanism for detaining the same and holding the valve in its open position, said means being disengaged from said mechanism when the oscillating member moves to a certain position, together with a clock actuated mechanism extending within said box adapted to actuate said means at a predetermined time independently of the oscillating member.

FRANK COLONNA.